Figure 1:
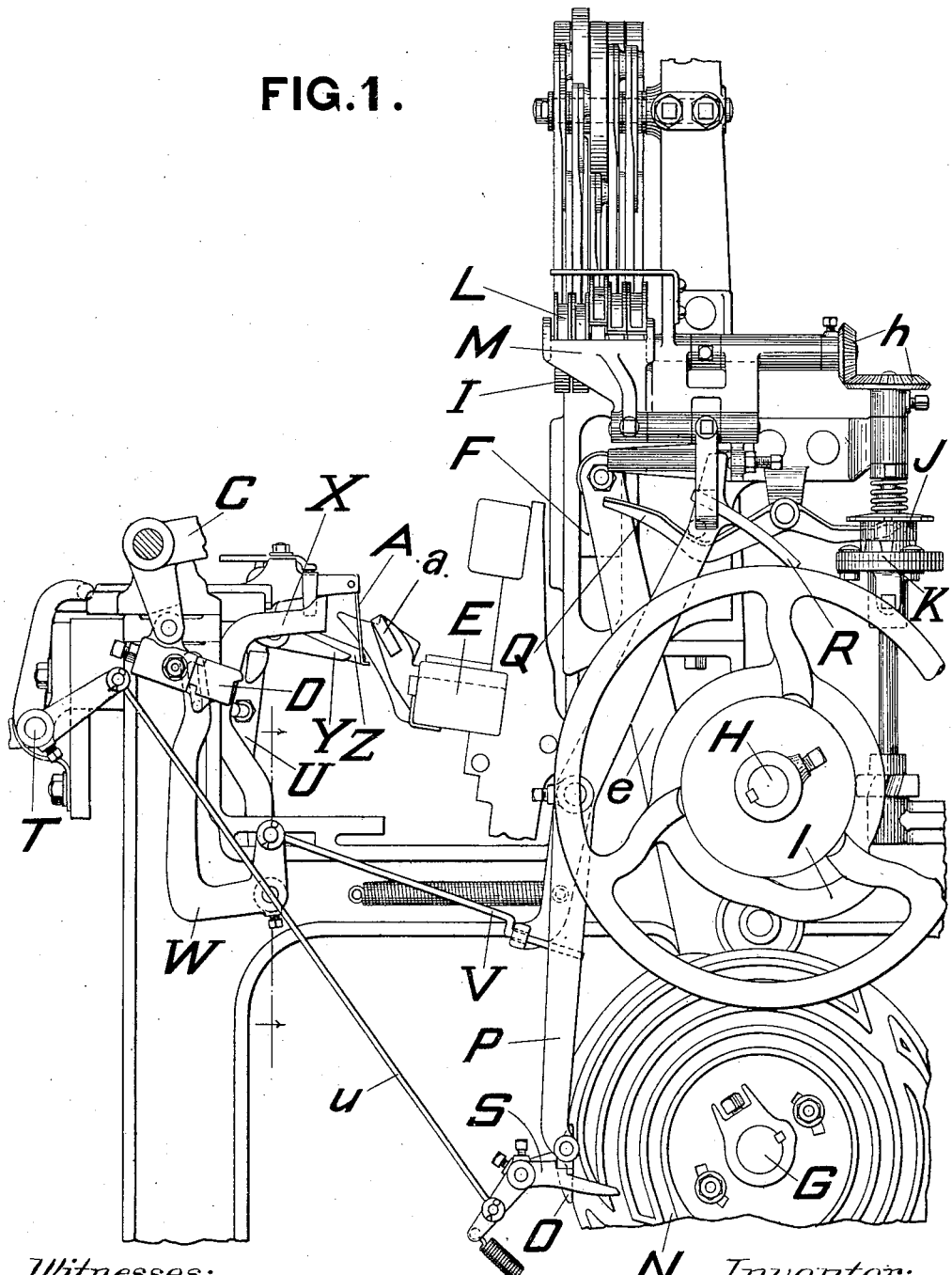

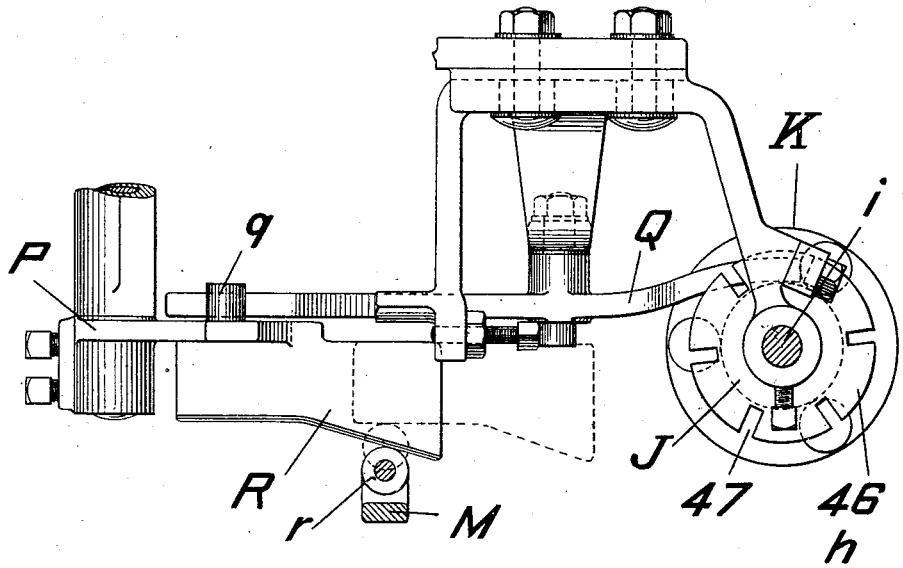
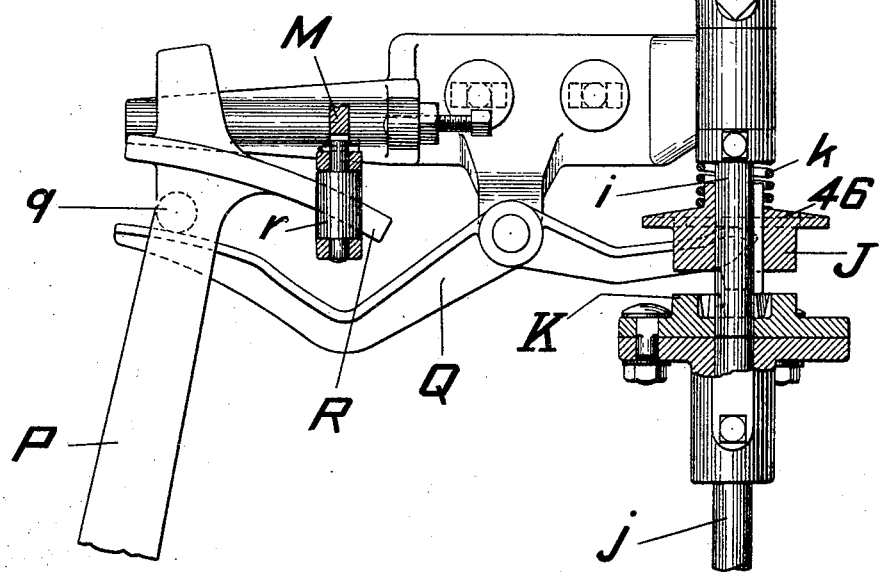

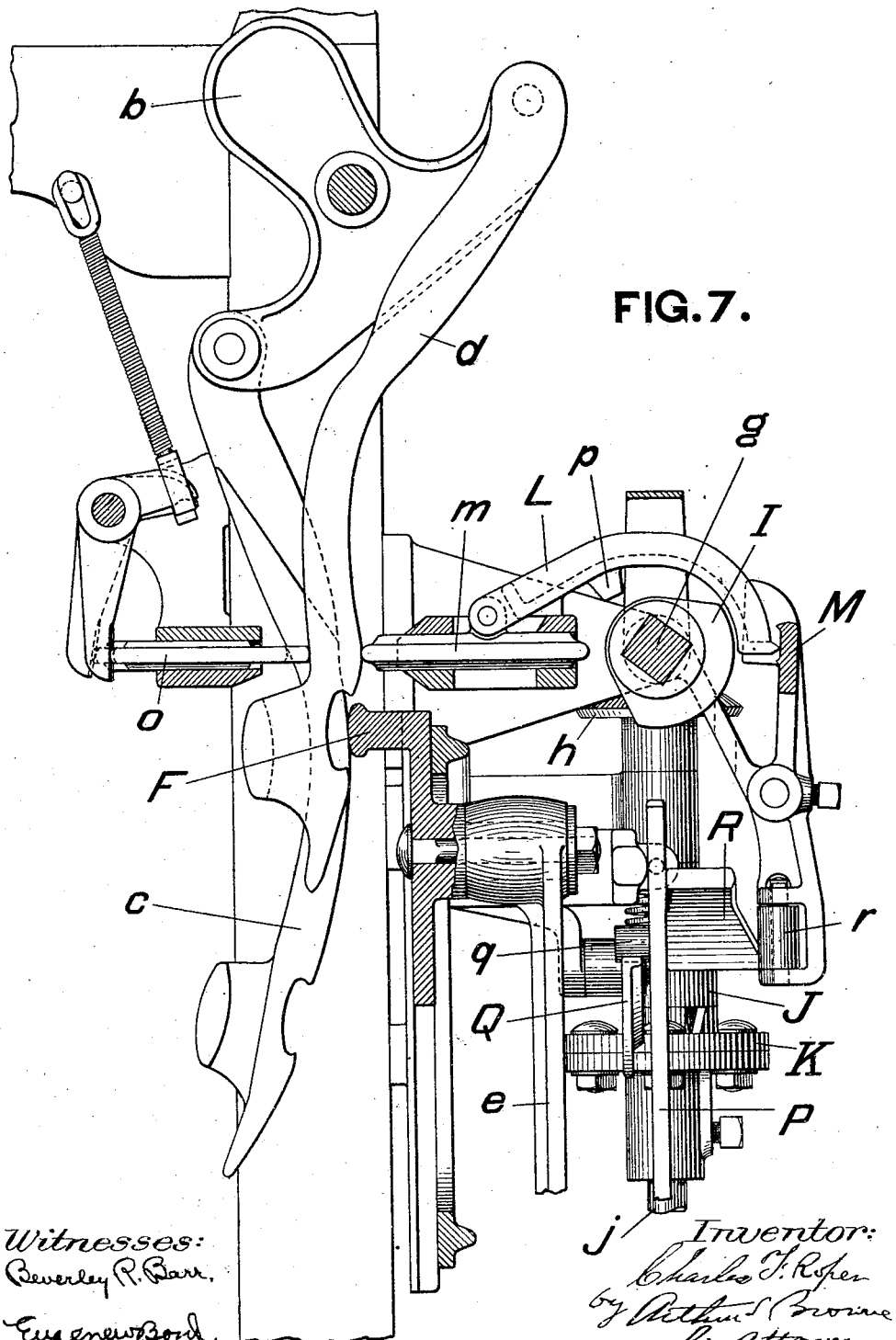

C. F. ROPER.
AUTOMATIC WEFT REPLENISHING LOOM.
APPLICATION FILED MAY 24, 1907.
964,557.
Patented July 19, 1910.
12 SHEETS—SHEET 7.
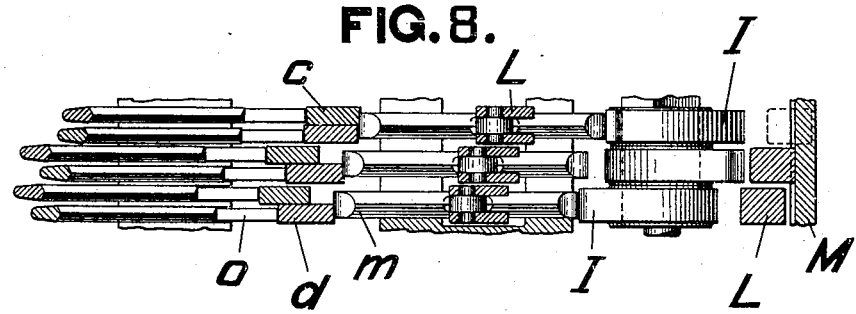
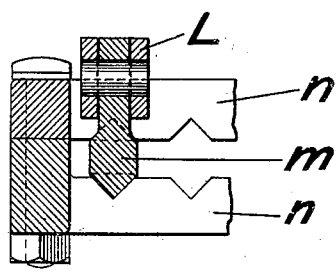
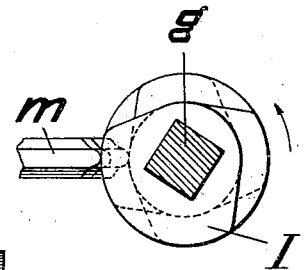
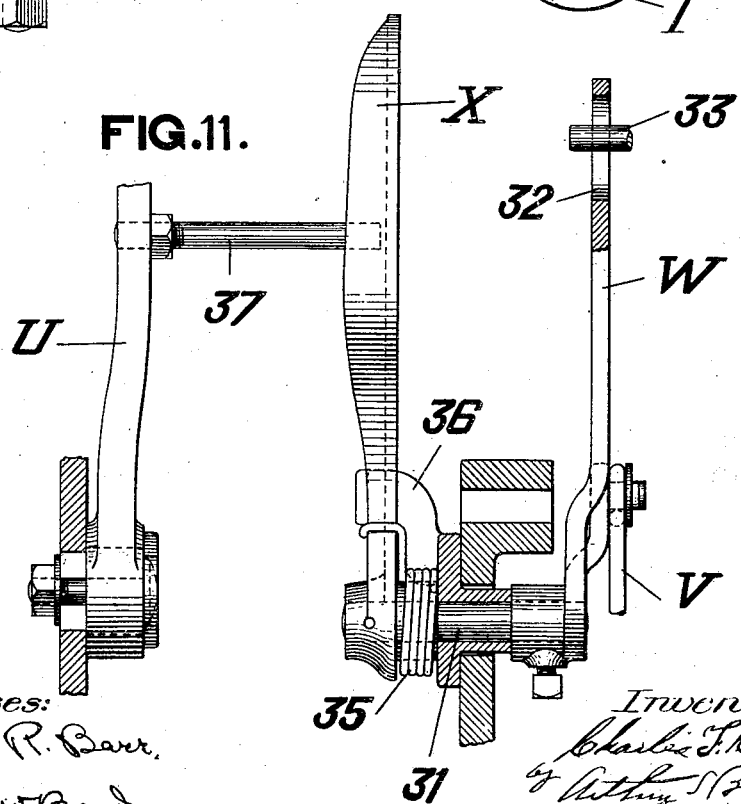

C. F. ROPER.
AUTOMATIC WEFT REPLENISHING LOOM.
APPLICATION FILED MAY 24, 1907.

964,557.

Patented July 19, 1910.
12 SHEETS—SHEET 8.

Witnesses:
Beverley R. Barr,
Eugene W. Bond.

Inventor:
Charles F. Roper
by Arthur P. Browne
his attorney

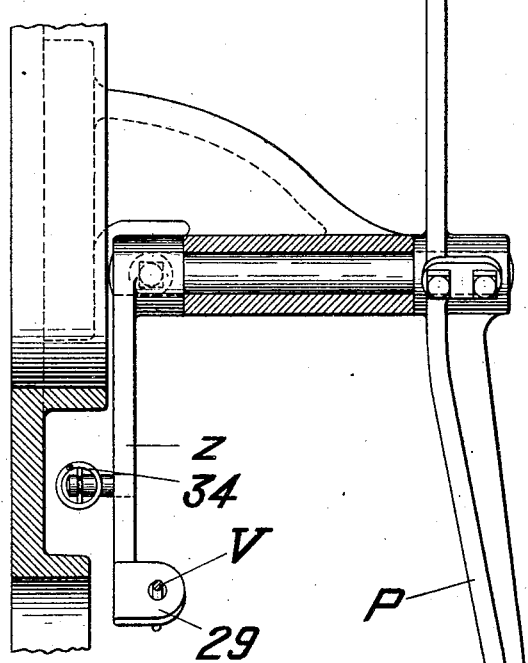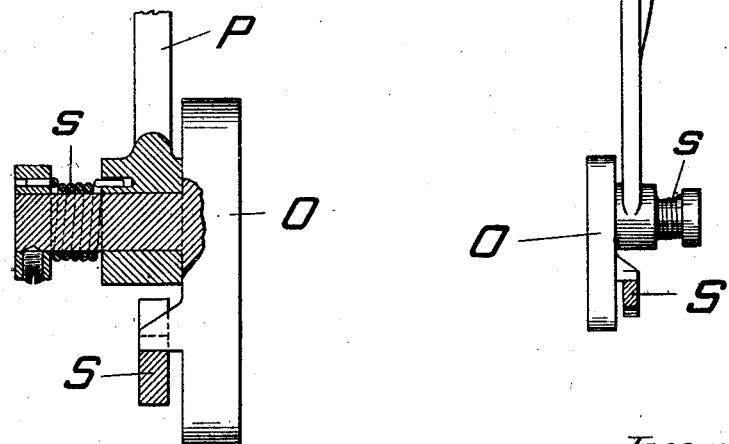

C. F. ROPER.
AUTOMATIC WEFT REPLENISHING LOOM.
APPLICATION FILED MAY 24, 1907.

964,557.

Patented July 19, 1910.
12 SHEETS—SHEET 10.

Witnesses:
Beverley P. Barr.
Eugene W. Bond.

Inventor:
Charles F. Roper
by Arthur S. Browne
his Attorney

C. F. ROPER.
AUTOMATIC WEFT REPLENISHING LOOM.
APPLICATION FILED MAY 24, 1907.
964,557.
Patented July 19, 1910.
12 SHEETS—SHEET 11.
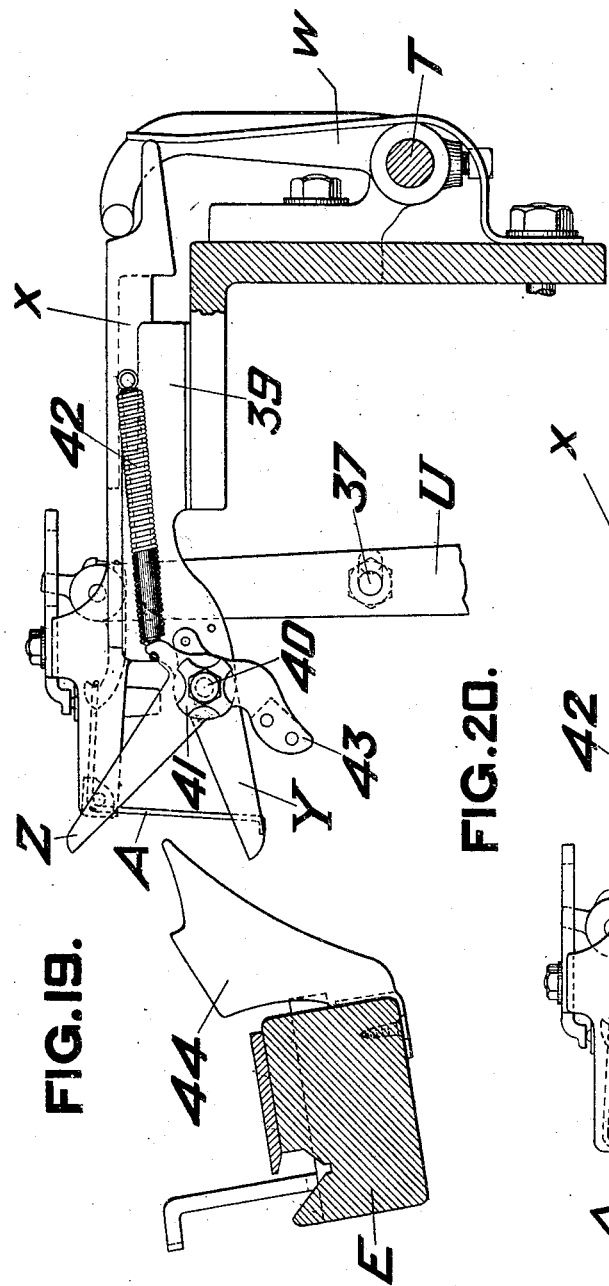
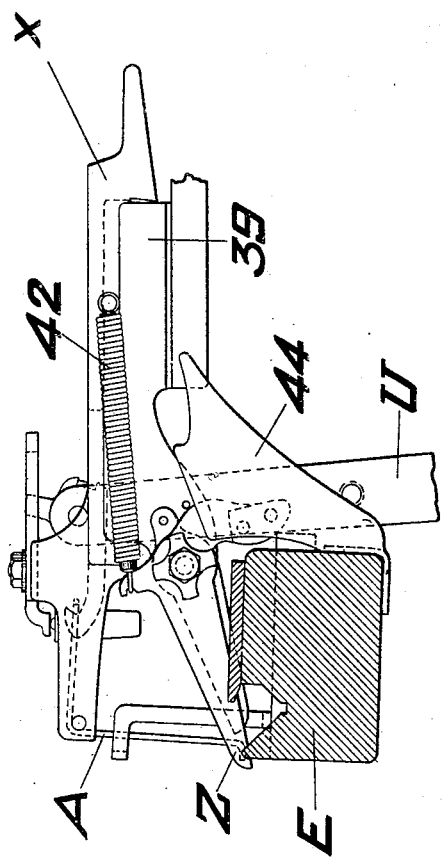
Witnesses:
Inventor:

C. F. ROPER.
AUTOMATIC WEFT REPLENISHING LOOM.
APPLICATION FILED MAY 24, 1907.

964,557.

Patented July 19, 1910.

12 SHEETS—SHEET 12.

Witnesses:

Inventor:

UNITED STATES PATENT OFFICE.

CHARLES F. ROPER, OF HOPEDALE, MASSACHUSETTS, ASSIGNOR TO DRAPER COMPANY, OF PORTLAND, MAINE, AND HOPEDALE, MASSACHUSETTS, A CORPORATION OF MAINE.

AUTOMATIC WEFT-REPLENISHING LOOM.

964,557.  Specification of Letters Patent.  Patented July 19, 1910.

Application filed May 24, 1907. Serial No. 375,461.

*To all whom it may concern:*

Be it known that I, CHARLES F. ROPER, of Hopedale, Worcester county, Massachusetts, have invented certain new and useful Improvements in Automatic Weft-Replenishing Looms, of which the following is a specification.

In automatic weft-replenishing looms, wherein there is a spare-weft magazine at one side and the automatic supply of weft is due to the detection of weft failure in the working shuttle, the first strand of fresh weft may not be laid in the same shed as that which was open when the weft-failure occurred, and the result may be a blemish in the cloth especially where a multiplicity of harness is used since there may be a shed formation in which no pick or only a partial pick is laid.

The object of this invention is to always introduce the first pick or strand of fresh weft in the same shed formation as that wherein the total or partial weft-failure occurred, thus "matching the pick", and insuring that every shed formation shall have at least a full pick. If the insertion of a partial pick is followed by weft-replenishment then that shed formation in the finished cloth will have a full pick and a partial pick, but this is not objectionable in many fabrics.

An important feature of the present invention is that the first strand of fresh weft is always laid when the working shuttle is traveling in the same direction as it did just prior to the detection of weft-failure; that is to say, the fresh weft is introduced into a shed either at one side or the other depending upon at which side weft failure was detected. Hence, if the last pick was a partial one, there is no danger of its free end being turned or disturbed by the incoming fresh weft. A special thread-cutter for the fresh weft is employed particularly adapted to the improved pick-matching mechanism.

One embodiment of the present improvements is illustrated in the accompanying drawings wherein—

Figure 2:
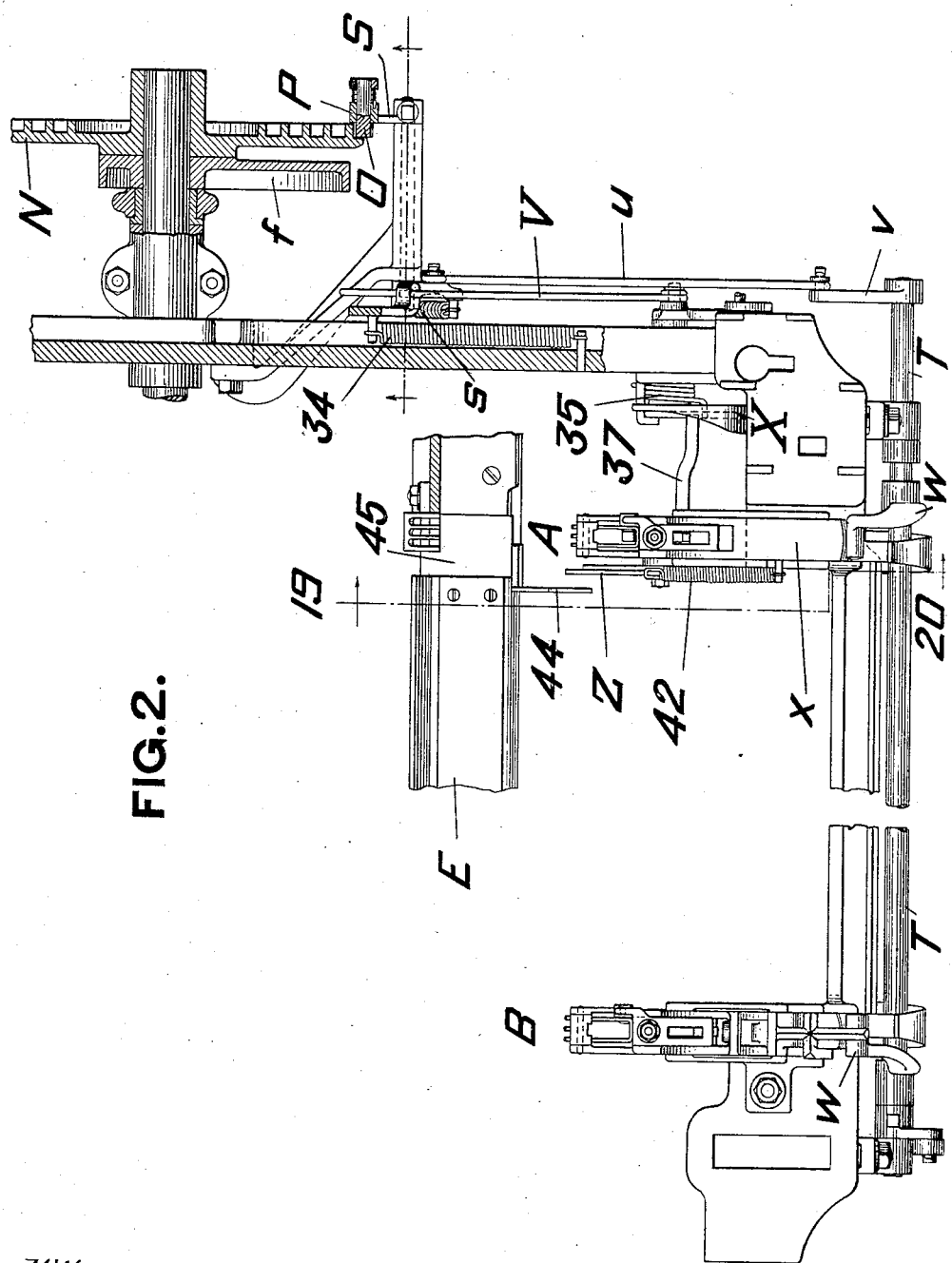
Figure 3:
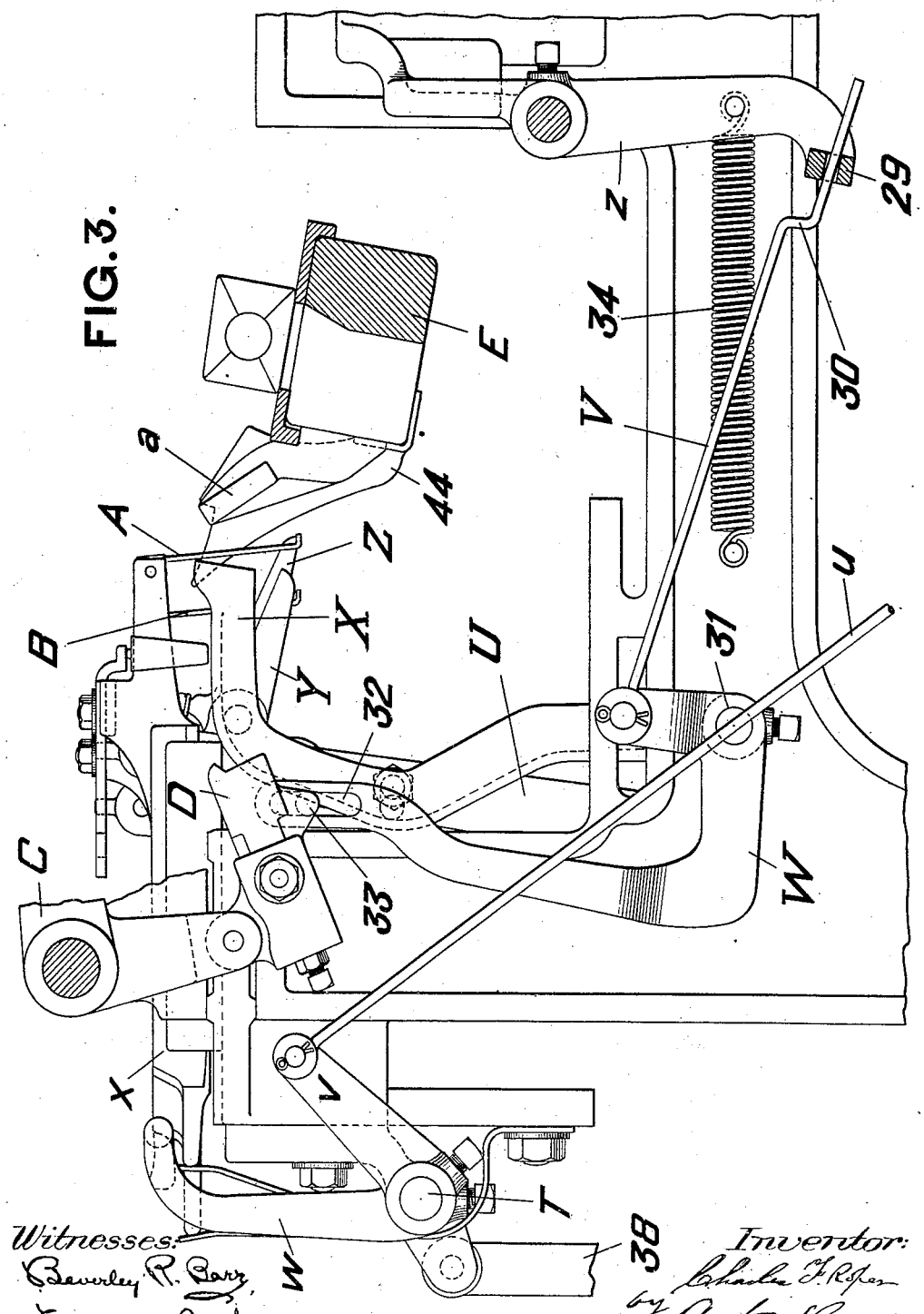
Figure 4:
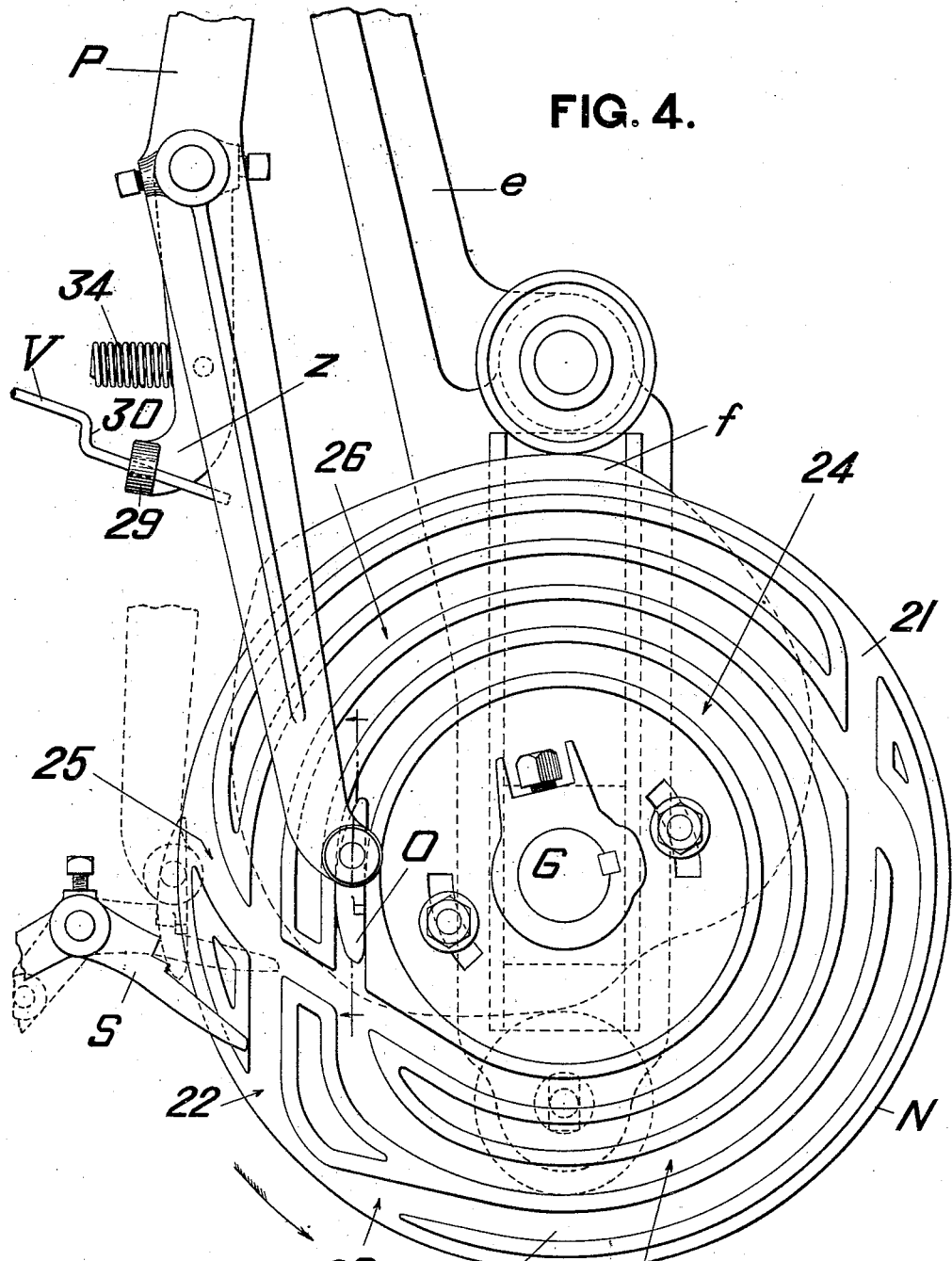
Figure 12:
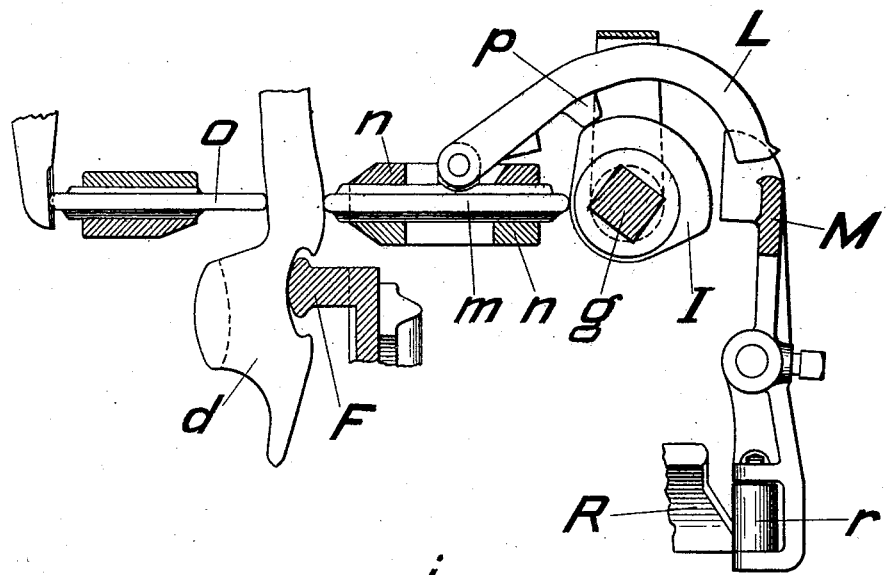
Figure 13:
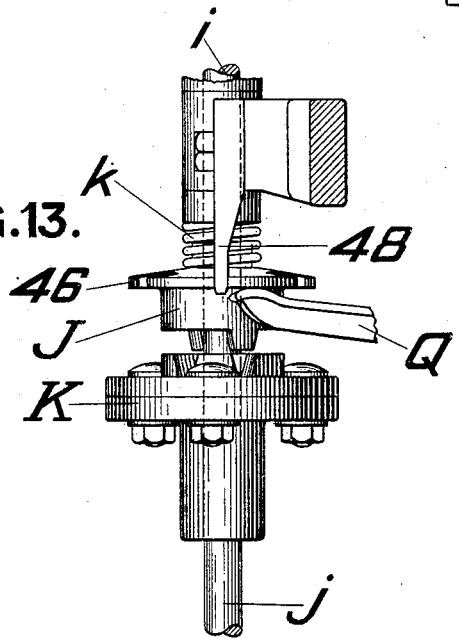
Figure 16:
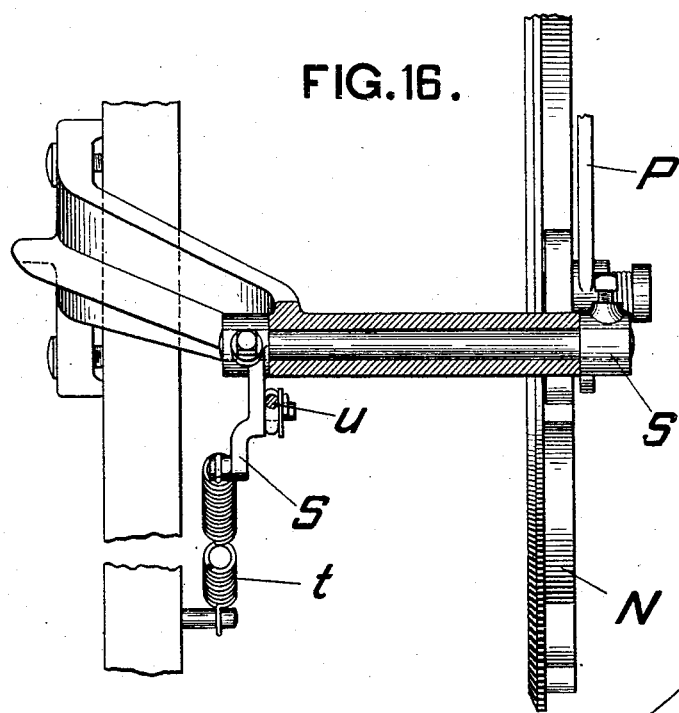
Figure 17:
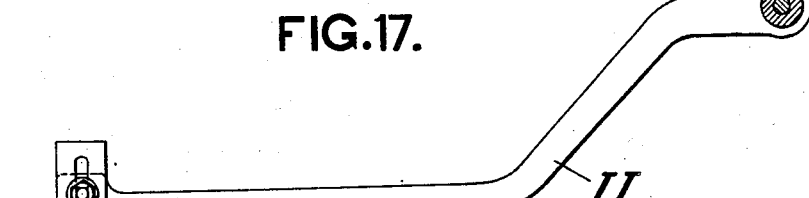
Figure 18:
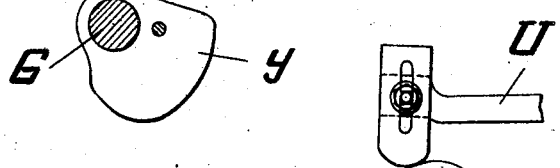
Figure 21:
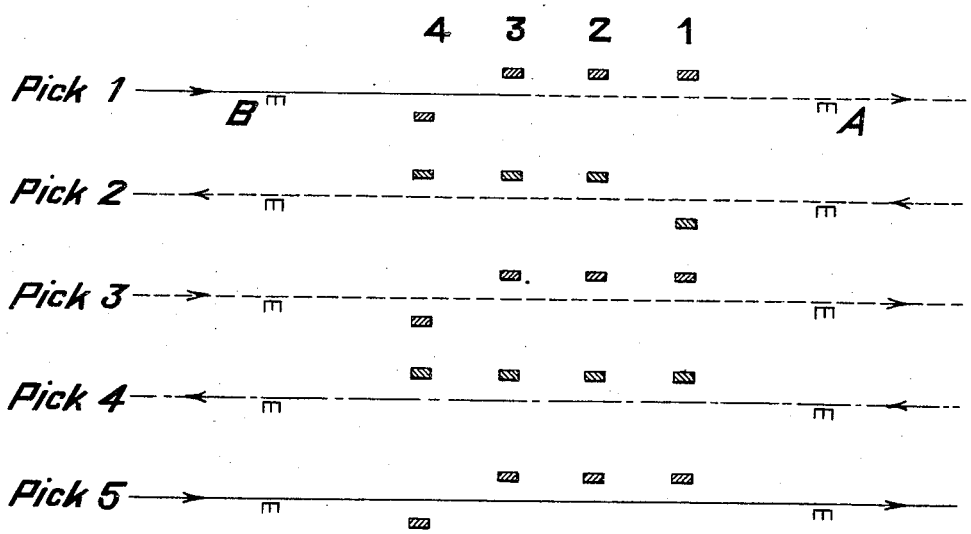
Figure 22:
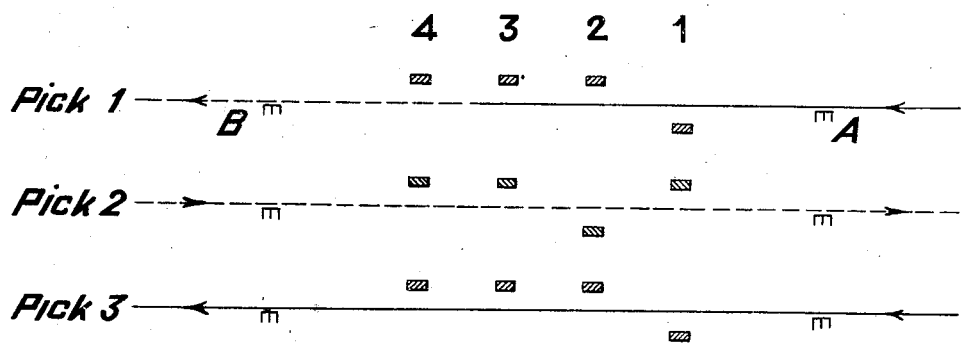

Figure 1, is a side view of so much of a loom as is necessary for an understanding of the present improvements, the loom being shown in normal weaving condition. Fig. 2, is a partial plan view, partly in section. Fig. 3, is a side view of a part of the loom, partly in section, showing the illustrated mechanism in position just previous to transferring weft. Fig. 4, is a side view of the differential harness governor in action. Fig. 5, is a plan, and Fig. 6, a side view, both partly in section, of the harness controlling devices as brought into action upon the detection of weft-failure. Fig. 7, is a front view, partly in section, of the harness actuating and controlling mechanism, the devices peculiar to only one harness being shown. Fig. 8, is a horizontal section of a part of the mechanism shown in Fig. 7. Figs. 9 and 10, are details of the pattern-controlling devices. Fig. 11, is a front view partly in section showing the relation between the shuttle-detector and the adjacent weft-fork hammer. Fig. 12, is a section of a part of the harness actuating and controlling mechanism illustrating a different condition from that shown in Fig. 7. Fig. 13, is a detail view illustrating a lock for the pattern cams when uncoupled from their driving shaft. Fig. 14, is a front view, partly in section, of the governor lever. Fig. 15, is a detail view of the runner of the governor lever. Fig. 16, is a front view, partly in section, of the latch which controls the runner. Fig. 17, is a detail section showing the cam which actuates the right-hand weft-hammer. Fig. 18, is a detail section illustrating the cam for the left-hand weft-hammer. Figs. 19, and 20, are both vertical sections, in the plane indicated by the line 19—20 in Fig. 2, illustrating the special thread cutter. Fig. 21, is a diagram illustrating the action when the right-hand weft-fork first detects weft-failure. Fig. 22, is a diagram illustrating the action when the left-hand fork first detects weft-absence.

In the illustrated embodiment of the invention, the detection of weft-absence is by detectors consisting of ordinary weft-forks of which there are two A, and B, one at each side of the loom as shown in Fig. 2, and for identification they will be designated as the "right" fork and the "left" fork respectively.

The automatic weft-replenishing will be assumed to be effected by ejecting the spent weft-carrier from the working automatically threading shuttle and inserting a fresh weft-carrier, as in the well-known "Northrop" or "Draper" loom shown in United States Letters Patent of Northrop No. 529,940, November 27, 1894. Such weft-replenishing mechanism is now so well-known that only so much thereof is herein shown as is necessary for the understanding of the present invention. There is shown in Fig. 3, a part of the usual transferrer C, and its pivoted spring-lifted dog D, which, when swung upwardly, is encountered by a bunter $a$, on the lay E. These parts are representative of the weft-supply magazine and the weft-replenishing mechanism, which may be as set forth in the United States Letters Patent of Stimpson, No. 718,587, January 13, 1903. In the illustrated construction, the supply magazine with the transferrer C, and dog D, are at the right hand side of the loom.

The shedding mechanism illustrated is the same in organization and mode of operation as that shown in United States Letters Patent of Roper, No. 770,116, September 13, 1904, and No. 817,806, April 17, 1906. Although five harnesses are illustrated only four are indicated as in action. The following description will assume that four harnesses are used, and that they are so actuated that at each shed-formation one harness will be down and three will be up.

The mechanism will be more readily understood after the mode of operation has been explained, and to aid in this explanation reference will be made to the conventional diagrams Figs. 21, and 22. These diagrams indicate four harnesses 1, 2, 3, and 4, and, in regular running each harness is down in its numerical order at the successive shed formations, each in turn thus characterizing the weave.

Assume that on a pick from left to right, (designated as pick 1, in Fig. 2) harness 4, is down, and that only a partial pick is laid, as indicated by the horizontal line part full and part dotted. In such case weft-failure is detected by the right fork A. Concurrently with this detection the harnesses shift in their normal way, and harness 4, rises, and harness 1, falls. The empty shuttle then goes from right to left on pick 2, but no thread is laid as indicated by the dotted line, this being a blank pick. The harnesses again change but in this case not in the normal sequence, because now instead of harness 1, rising, and harness 2, falling, harness 4, falls while harness 1, rises. The empty shuttle then makes pick 3, which is also a blank pick as indicated by the dotted line, this pick being from left to right and hence to the supply side of the loom. The shuttle then gets a fresh supply of weft; but at this time while harness 4, rises, no other harness falls so that no shed is formed, there being an arrest of shed formation. Hence when the replenished shuttle makes pick 4, from right to left it lays no thread because there is no shed to receive it, but the fresh thread is drawn out from the shuttle which passes entirely below all the warp threads. This pick may hence be regarded as an "idle" pick, as distinguished from a "blank" pick, and its different character is indicated by the broken line in Fig. 21. Harness 4 now falls, so that when pick 5 takes place, the harness formation is the same as at pick 1. The shuttle in making pick 5, lays the first strand of fresh weft, and while the shuttle is traveling in the same direction, from left to right, as when the weft-failure occurred. Hence the first fresh pick is laid in the right shed and in the right direction; and this shed can never be empty though it may have (as in the illustrated example) a partial pick and a full pick.

It will be noted from Fig. 21, that during this detecting and replenishing operation harness 4 moves either up or down at each pick; that the following harness 1, moves down and then up; that the other harnesses do not move at all; and that there are two blank picks which will be detected by the two forks A, and B respectively. Hence this mode of operation requires (1) preventing the normal sequence of harness formation; (2) keeping the harness (or harnesses) which characterize the weave in operation throughout the detection and replenishment, this involving a "repeat" instead of a "change"; (3) arresting shed formation; (4) replenishing the weft; and (5) rendering ineffective the two forks during the two idle picks.

Assume now that the detection of weft failure follows a pick from right to left, as shown in Fig. 2; and assume that in this case harness 1, is the weave-characterizing harness, being down while the other three are up. The weft fails as the shuttle makes this first traverse or pick, and it may be assumed that a partial pick is laid, as indicated by the line partly full and partly dotted. Following this pick the left fork B, detects weft-failure, and the harnesses shift in due sequence, harness 1, rising and harness 2, falling. The empty shuttle then makes pick 2, to the right or supply side, and the pick is blank as indicated by the dotted line. Following this pick the shuttle receives a fresh supply of weft. The harnesses also shift but not in the normal sequence, since now harness 2, rises while harness 1, falls again instead of harness 3, as in the regular order. This opens for the third indicated pick the same shed formation as for the first pick shown in the diagram, so that the replenished shuttle lays the first pick of fresh weft in the same shed as that in which the deficiency occurred, and the shuttle on both of these picks travels in the same direction. This detecting and replenishing operation illustrated in Fig. 22, involves, (1) preventing the normal sequence of harness formation; (2) "repeating", or keeping the weave-characterizing harness in operation throughout the detection and replenishment; (3) replenishing the weft; and (4) rendering ineffective the right hand fork on the blank pick from left to right.

The entire operation shown in Fig. 21, lasts through five picks, while that of Fig. 22, lasts through three picks, thus involving a differential delaying action both with respect to the sequence of shed-formation and to the period during which the weave-characterizing harness repeats or remains in action. This differential action is due to a differential shed governor which governs the action both of the pattern-mechanism controlling the sequence of shed-formation and also of the harness-actuator which reciprocates the harnesses. When weft-failure occurs, as in Fig. 21, both pattern-mechanism and harness-actuator are affected; but, when weft-failure occurs as in Fig. 22, only the pattern-mechanism is affected.

When the right-hand fork first detects weft-absence the supply of fresh weft is delayed for a predetermined number of revolutions greater than two of the crank or lay actuating shaft of the loom; whereas when the left hand fork first detects the delay is less in duration than when the right hand fork detects. This governance of the shed-formation requires keeping in mind the harness mechanism, and as much of the same is herein illustrated as is necessary for understanding the present improvements. Each harness is immediately moved by a pivoted cam-lever $b$, (Fig. 7), to the opposite ends of which are pivotally connected coupler-bars $c$, and $d$, each of which may be coupled to an actuator F, (common to all the harnesses) which is vertically reciprocated through a rod $e$, (Figs. 1, 4 and 7) by a cam $f$, on the harness-controlling shaft G, (Fig. 4) which, in this instance, is the pick-cam or low-shaft of the loom, making one revolution to two revolutions of the lay-actuating or crank-shaft H, shown in Fig. 1. The coupling of each harness to the reciprocating actuator F, is determined by a selector-cam I, (Fig. 7) of which there is one for each harness, said cams being on a horizontal shaft $g$, geared by bevel gears $h$, (Fig. 1) to a vertical driven shaft $i$, on which is splined (Fig. 6), a sliding clutch J, which coöperates with a clutch K, fast on a lower driving vertical shaft $j$. The two clutches are normally held together in driving contact by the spring $k$, so that the two vertical shafts $i$, and $j$, then turn together. The driving shaft $j$, is driven intermittently by a cam $l$, (Fig. 1) on the crank-shaft H, as in said Patents Nos. 770,116 and 817,806. At each rotation of the crank-shaft the selector-cams I, are rotated one step, and a change is effected in the harnesses which are coupled to the actuator F. Each selector-cam controls a cam-actuated follower $m$, (Fig. 7) which is guided to move horizontally by fixed guide plates $n$, (Fig. 9); and each follower coöperates with the two coupler bars $c$, and $d$, of one of the harnesses. Each coupler-bar $c$, and $d$, is pressed toward its follower $m$, by a spring-actuated follower $o$, (Figs. 7 and 8). The selector-cam I, acts to thrust its cam-actuated follower $m$, against the coupler bars $c$ and $d$, and to uncouple the bar in action from the actuator F, thus rendering the corresponding harness idle; and, since there are two coupler bars for each harness, this may occur when the harness is either up or down. The cam-lever $b$, is shown in Fig. 7, in position to maintain its harness up. When the position of a selector cam permits, the corresponding spring-actuated follower $o$, swings the coupler-bars $c$, $d$, toward the actuator F, and effects the coupling of one of said bars to the actuator thereby putting the corresponding harness into action. It requires three steps of one of the selector-cams to put a harness both into and out of action. The first step of a selector cam puts it into the position shown in Fig. 7, where it does not prevent coupling of a bar $c$, or $d$, (as the case may be) to the actuator F. The second step of a selector-cam leaves the coupling unaffected, as shown in Fig. 12; while the third step of the cam uncouples its harness from the actuator. The fourth step leaves the harness idle, as evident from Fig. 10. All of these shed-forming devices are substantially the same in organization and mode of operation as in said Patent No. 817,806, excepting that the clutches J, and K, and the division of the vertical shaft into the two sections $i$, $i$, are new. It is evident from a consideration of this mechanism that if the clutches J, and K, are separated, the sequence of shed formation will cease, and the harnesses then coupled to the actuator will continue to reciprocate or "repeat"; and, also, that a harness may be uncoupled from the actuator independently of its selector-cam by the addition of appropriate devices such as shown in Fig. 7. Such auxiliary controlling devices for the cam-actuated followers $m$, comprise a tumbler L, pivoted at its inner end to each follower $m$, the outer ends of all the tumblers being part of the time in the path of the upper end of an uncoupling lever M, which is centrally pivoted to a fixed part of the loom. Each tumbler has a depending foot $p$, which is adapted to rest on a high part of the corresponding selector-cam I, and when so resting, the tumbler is upheld out of the path of the uncoupling lever, as shown in Fig. 12. But the harness which has just been brought into action has its tumbler-foot opposite a low part of the selector-cam, as shown in Fig. 7, so that the tumbler then falls by gravity into the path of the uncoupling lever M. By moving the upper end of this uncoupling lever inward the harness last brought into action will be uncoupled and rendered idle. When the uncoupling force ceases, the uncoupling lever M is restored to idle position by gravity aided by the spring-actuated followers o, pressing on the coupler bars which are to be restored to action.

By automatically controlling the clutch J, K, and the uncoupling lever M, on the detection of weft-failure, the shed-formation is correlated to the weft-replenishment so as to produce the results of pick-matching already described. If weft-failure is detected by the right fork, the clutch is opened, and thereafter the uncoupling-lever is actuated; whereas, if the left fork detects weft-failure, only the clutch is opened, and it remains open for a shorter period of time. This differential control is effected by a differential shed-governor N, and connected mechanisms which are controlled by the weft-forks, and in turn control the clutch J, K, and the uncoupling lever M.

The governor N is a disk fast on the harness-controlling shaft G, and which has on its outer face a plurality of cam-paths into which may enter a runner O, centrally pivoted to the lower end of a governor lever P, (centrally pivoted to a fixed part of the loom) the upper end of which has a laterally projecting stud q, (Figs. 5 and 6) which acts upon the upper cam-face of a clutch lever Q, centrally pivoted to a fixed part of the loom. This clutch lever Q acts upon the sliding clutch J to raise it. During the normal running of the loom, this lever P occupies the position shown in Fig. 1, and the clutches J, K, are then coupled. When, however, the lever P, swings to the position shown in Fig. 6, the stud q, acts on the cam-face of lever Q, thereby swinging said lever and raising clutch J, out of engagement with clutch K, and hence stopping the change of shed-formation. When lever P, swings back to the position shown in Fig. 1, the spring k, again brings the two clutches together, and the harness pattern or selector-cams resume their action. Likewise lever P, has at its upper end a cam R, (Figs. 5, 6, and 12) which coöperates with a roller r, on the lower end of uncoupling lever M, (Fig. 7) when the upper end of lever P, swings forward. Hence, when lever P, so swings, the uncoupling lever M, renders idle the last harness previously coupled to the actuator F. This occurs only during the latter part of the forward movement of the upper end lever P, whereas the clutch lever Q is actuated by stud q, to disengage the clutch J, K, during the first part of the forward movement of the upper end of lever P. Hence by regulating the extent of swing of the lever P, either the clutch alone, or the uncoupling lever also, can be put into action.

This is effected by the differential cam-paths of the governor, N, which will be explained in connection with the instrumentalities between the two weft-forks and the runner O.

The runner O, has a spring s, (Fig. 15) which tends to press its upper end toward the shaft G, but is normally prevented by a latch S, which is a lever centrally pivoted to a fixed point of the loom, (Figs. 1, 4, and 16,) and is normally maintained in runner latching position by spring t. The tail of this latch is connected by link u, with a crank arm v, fast on the starting shaft T, which has fast on it two fingers w, w, which extend upwardly into the paths of the usual weft-fork slides x, x, of the two forks A, and B, respectively. Only the finger w, for the left-fork B, is shown in Fig. 3, it being there shown pushed forward following the detecting action of the left-fork. These forks are acted upon in the usual way by the usual weft-hammers U worked in alternation by cams y, on the cam shaft G, as shown in Figs. 17 and 18. Specifically, it may be noted, that the connections, as far as illustrated, between weft-hammer and weft-fork are those of United States Letters Patent of Roper, No. 840,377, Jan. 1, 1907.

Whichever fork first detects weft-failure, is caught by its weft-hammer, and its slide x, is moved forward, thus rocking the starting shaft T, and hence releasing the latch S, from the runner O. There is no difference in the action of the two forks in this respect. Each simply controls the latch S, and also the take-up as hereinafter explained. The differences in result are due to the fact that the governor N, makes one rotation to two picks of the shuttle, and has two entrances 21, and 22 to its cam-paths. Hence, if fork A detects, the runner O, will go in through entrance 21, while if fork B detects the runner goes in at entrance 22. The governor rotates in the direction indicated by the arrow in Fig. 4. Assume now that the right fork first acts. The runner O, is then released at such time relatively to the rotation of the governor N, that it goes into the entrance 21, being thereby directed into path 23. This swings the lower end of lever P, toward the shaft G, and hence its upper end forward a sufficient distance to move the clutch lever Q, to disconnect the clutches J, K, and hence stop the further advance the pattern or selector cams I. The timing is such that (in the particular case shown in Fig. 21) harness 1, has been coupled to the actuator F, and harness 4, has not yet been uncoupled; and as the action of the selector cams is now discontinued, both these harnesses remain in action, and the effect is the same as though the loom was a two-harness loom. Hence pick 2, (Fig. 21) is with harness 4, up, and harness 1, down, just as though no detection had occurred. The runner O, remains in path 23, until after the next movement of the actuator F, so that harness 4, up, and harness 1, down, just as ready for pick 3. Before, however, the fourth pick occurs, the runner O, passes from path 23, into path 24 (as shown in Fig. 4) thus moving nearer to shaft G, and hence swinging the upper end of lever P, still farther forward. This brings uncoupling-lever M, into action with the result that harness 1, is uncoupled from the actuator as shown in Fig. 7, so that it stays up. The still active harness 4, is not, however, uncoupled, because, owing to its selector-cam I being in a different position from that of harness 1, (see Fig. 12), its tumbler L is held uplifted above the path of uncoupling lever M, by its foot $p$, resting on a high part of its selector-cam. Pick 4, occurs after harness 4 has been moved up by the actuator F, so that then all the harnesses are up, and no shed is formed. Hence pick 4, is an idle pick, although thread is drawn out, since fresh weft has by this time been supplied. At the conclusion of pick 4, harness 4, again descends, since its coupling to the actuator F, has not been affected. This restores the shed-formation which existed when the weft failed, so that the first pick of fresh weft (at pick 5) is laid in the correct shed. Before the next (or sixth) pick occurs, the runner O, has escaped from the cam-paths through the outlet 25, and harness 1 is again coupled to the actuator, the clutches J, K, are engaged and the normal sequence of shed-formation is restored.

The length of the cam-paths 21, 23, 24, and 25, is such that the harness controlling devices perform their office in proper time relatively to the picking, and other operations. It will be noted that the harness which was in action at the beginning (No. 4 as illustrated) remains in action throughout; and that the last harness (No. 1) brought into action is the one rendered inoperative by the uncoupling lever. In case, however, the left fork first detects weft failure, the runner O, is released by the latch S, when the governor N, occupies a different position, and accordingly, the runner does not get into the cam paths through the entrance 21 but through the entrance 22, which is diametrically opposite thereto. This entrance 22, admits the runner into different cam paths 26, and 27, occupying about 360 degrees of arc, cam path 27, terminating at the outlet 28. These two cam paths extend sufficiently near to the shaft G, to permit the lever P, to swing just enough to separate the clutches J, and K, to stop the further movement of the pattern or selector cams, but not far enough to uncouple any harness from the actuator through the uncoupling lever M. Accordingly the sequence of operations takes place which is illustrated in Fig. 22; that is to say, as there illustrated, the stoppage of the selector cams occurs at such time that harness 1, is still left coupled to the actuator and harness 2, is coupled to the actuator. Hence during the replenishing operation these two harnesses remain in action and are moved alternately up and down, as indicated in Fig. 22. This reopens the correct shed for the reception of the first pick of fresh weft as already explained. Before the next following pick (which would be pick No. 4 in diagram 22), the runner O, has left the path 27 through the outlet 28, thus again engaging the clutch J, K, and hence putting the selector cams again into action, so that the sequence of shed formation is resumed. The length of the cam paths 22, 26, 27 and 28, is such that the harness-controlling devices perform their offices in proper time relatively to the picking and other operations when the left fork detects weft failure.

The time of action of the harness controlling devices must be properly correlated to the time when the weft replenishing takes place, which must be after the close of pick No. 3, as in Fig. 21, and after the close of pick No. 2, as in Fig. 22, since the supply magazine is at the right side of the loom. Obviously, the supply transferrer C, must not act when the shuttle is in the shuttle-box at the left-hand side of the loom, and means to prevent such action are hereinafter described.

Secured to the governor lever P, so as to swing therewith is an arm $z$, (Figs. 1, 3, and 14), which has a perforated lug 29, through whose perforation loosely extends a rod V, having a shoulder 30, in front of the lug 29. The forward end of this rod is pivoted to a lever W, fast on shaft 31, (Fig. 11) journaled to the loom frame. This lever has a slot 32, (Fig. 3) in which rides a lateral lug or pin 33, (Figs. 3 and 11) on the transferrer spring-actuated dog D. Normally these several parts stand in the positions shown in Fig. 1, being held there by the spring 34, (Figs. 3 and 14) and 35, (Fig. 11), said spring 35, being that which lifts the dog D. When, however, the runner O, enters one of the cam-paths, the lever P swings, thereby moving arm $z$, rearwardly, moving its lug 29, away from shoulder 30, and hence leaving rod V, and lever W, free to move, and hence leaving dog D, free to be swung by spring 35, into the path of the lay bunter $a$. This occurs whichever fork detects. Only a slight movement is needed to release the runner O, from its latch S, and this release occurs just following detection, and before the ensuing pick begins, being determined by the setting of the weft-hammer cams $y$. This is followed immediately by the runner entering the appropriate cam-path entrance, so that the motion of the selector cams is stopped before another up and down shift of harnesses begins.

As the lay beats forward at every pick of the shuttle it is necessary that its bunter $a$ should not strike the dog D except when the shuttle is in the right-hand shuttle box. The loom has a shuttle feeler X, (Figs. 3 and 11) having the usual office of preventing weft-replenishment in case the shuttle is not properly boxed at the supply side. The shuttle feeler is fast to the same shaft 31, as is the lever W. The spring 35, tends to move the shuttle-feeler and the lever W, toward the lay, and a stop 36, limits such rearward movement of both. The entrance of the runner O, into one of the cam-paths leaves the shuttle-feeler and lever W free to be moved back by spring 35. Should the shuttle-feeler strike a misplaced shuttle, the spring 35, yields, and the dog D is not lifted far enough to be struck by the lay bunter $a$, and hence no weft-transfer can take place until the shuttle is properly boxed. The loose connection between rod V, and lug 29, permits this action. Assuming, however, that the shuttle boxes properly each time, then, the dog D, must not be in the path of the lay-bunter $a$, when the shuttle is in the left-hand box. Assume that the right fork A, detects weft-failure, this detection occurs, through the setting of the weft-fork, when the lay is near front center, and after the lay bunter $a$ has passed the dog-engaging point. The right-hand weft-hammer U, then engages the right-fork after the lay has started back, and the timing and shape of its cam $y$, (Fig. 17) is such that it does not again release the fork until after the shuttle is in the left-hand box, and after the lay-bunter has again passed the dog-engaging point on the forward beat of the lay. During this action of the right-hand weft-hammer the dog D is held in a depressed inactive position by a lateral pin 37, (Figs. 2, and 11) on the weft-hammer U, which engages the shuttle-feeler X, and prevents the lever W, swinging far enough to let the transferrer dog D, move into the path of the bunter $a$. When, however, the shuttle is next in the right-hand box, said weft-hammer U, is so far back, that the dog D is hit by the bunter $a$, and fresh weft is inserted into the shuttle. Hence a transfer is dependent (1) upon the position of the runner O, in one of the cam-paths; (2) the rearward position of the shuttle-feeler; and (3) the occupancy by the shuttle of the box at the supply side of the loom.

The detection of weft-absence by the two forks during the blank picks occurring after the runner O, has entered one of the cam-paths, has no effect because the only thing which then happens (aside from the governance of the take-up) is an idle movement of the latch S. In case the shuttle-feeler should prevent weft-replenishment at the proper time, the action is simply repeated. That is to say, at the next detection following the emergence of the runner from one set of the cam-paths, it reënters the same set of cam-paths, and so on until the replenishment occurs; the harnesses being properly taken care of by the differential harness-governor. It is thus seen that the same governor not only governs the harnesses, but also the weft-replenishing mechanism, since its action is dependent upon the runner entering the cam-paths. There is no difference in this respect between the action of the two forks, each putting the governor into action.

The take-up is stopped during the replenishing operation; but as such action is now so well-known it is deemed unnecessary to show the connection between the starting shaft T and the take-up beyond the initial arm 38, which serves as a conventional illustration of the take-up and its controlling mechanism.

The insertion of the fresh weft in the manner shown in Fig. 21, renders desirable a different fresh weft-cutter from those now in use, since the thread passing beneath the warp, as shown at pick 4, Fig. 21, may sag to such position as to be out of reach of the usual forms of thread cutters. The cutter shown is especially applicable to the new mode of operation. As shown in Figs. 2, 19, and 20, the cutter comprises a stationary blade Y, and a movable blade Z. The stationary blade is carried by the strand or guide 39, for the weft-fork slide $x$, at the supply side of the loom. The movable blade Z, is pivoted to the fixed blade at 40, and is held in cutting contact therewith by the spring washer 41. The tail of the blade Z, is connected by spring 42, with the weft-fork slide $x$. When the weft-fork slide $x$, is moved forward by the weft-hammer U, as shown in Fig. 19, the spring 42 is strained and the blade Z, is opened. Then when the lay next advances it strikes the heel 43, of the movable blade throwing it down to the position shown in Fig. 20, thus cutting any thread which may then be between the two blades. A thread guide 44, on the lay directs the fresh thread leading from the supply to the shuttle into the mouth of the open cutter. The points of the blades enter the usual fork channel 45, (Fig. 2) of the lay as the lay beats forward, said channel being made sufficiently wide. As heretofore explained the timing of the right-hand weft-hammer U, is such that the spring 42 is not strained nor the cutter blades opened until the shuttle is in the box at the left-hand side of the loom. Hence after pick 4 (Fig. 21) the fresh thread is cut leaving a long end extending beneath the warp to the shuttle in the left-hand box. On the next pick from left to right, this weft-end is drawn into the shed, thus constituting the first pick of fresh weft, it being long enough for the purpose, and leaving no objectionable projecting end.

During the normal running of the loom the spring 42, is not strained, so that the movable blade is not opened, and there is no danger of cutting the running weft.

The action of the thread-cutter is due to the right-hand weft-hammer, and it follows the otherwise idle detecting action of the right-fork A, following pick 3, in Fig. 21, and following pick 2, in Fig. 22. Hence, the thread is cut when the shuttle is in the left-hand shuttle-box whichever fork first detects weft-absence. The thread-cutter is between the weft-fork A, and the adjacent selvage, as indicated in Fig. 2, so that when the thread is cut off following pick 3, in Fig. 22, it is cut close to the selvage.

Should the fresh weft fail to automatically thread into the shuttle-eye, (as occasionally happens), the weft breaks, and another detection and weft-replenishment occur. With the described mechanism, no fault in the cloth then occurs, since the pick will be matched when an effective replenishment takes place.

It is important that the selector cams I, should be held accurately in place when unclutched from the driving shaft $j$. To this end, the clutch J, has a flange 46, (Fig. 5) with notches 47, one for each rotative step of the shaft $j$. With this notched flange coöperates a fixed locking stud 48, (Fig. 13), carried by a fixed part of the loom. When the clutch J, is lifted, as shown in Fig. 13, one of the notches is engaged by the stud 48, thereby locking the selector cams. When the clutch is again lowered into engagement with the clutch K, the flange 46, is below the stud 48, which then does not obstruct the free rotation of the selector cams in unison with the driving shaft $j$. This pick-matching mechanism is applicable to any number of harness without any change in the shed governor. It will be noted that only two harnesses are affected, the others remaining idle; and, hence, it makes no difference how many idle harnesses there are. Also, the same mechanism is applicable to weaves wherein groups of harnesses are moved concurrently. In case of a materially greater number of harnesses than five, and where the variation is by one harness at a time, changes in the tumblers L, may be necessary in order that their feet $p$, may properly coöperate with the high and low parts of the respective selector cams, but this does not require any change in the rest of the mechanism. The harnesses can be arranged to couple with the actuator F, in such manner that, on the idle pick, the shuttle will pass over all of the warp threads instead of under them all. It is deemed preferable, however, that the shuttle should pass beneath the warp-threads thereby avoiding the possibility of the shuttle being thrown out. The differential weft-supply shed governor, and the thread cutter, are also applicable to looms wherein the mode of operation may be different from that specifically described. For example, a shed governor involving the same general principle may be used in a loom wherein the shuttle does not at times pass below or above all the warps; or in a loom wherein its delaying office only is utilized. The wide range of applicability of the shed-governor with its connected mechanism to different numbers of harnesses and varying sequences thereof is an important feature. Obviously the pick-matching devices can be used with other thread-cutters, and vice versa.

Instead of continuing the reciprocation of the harness last brought into action prior to detection of weft-absence, (as in the case of harness 4, in Fig. 21) the tumbler thereof can be so arranged (by a change of the position of its foot $p$) that said harness will be uncoupled by the lever M, concurrently with harness 1, with the result that the shed formation will be arrested with harness 4, down. In such event the fresh weft will be inserted at pick 4, in Fig. 21, and in the correct shed; but in this event the shuttle will not be traveling in the same direction as when laying the last incomplete pick of the spent weft. The result of pick-matching will, however, be accomplished. This also involves a difference in the cam paths.

In this described construction, each weft absence detector controls the weft supply wholly independently of the other. Whichever fork first detects weft absence, the mechanism is put into action which governs the weft supply and the shedding and it makes no difference what the subsequent action of the other fork may be. The other fork may detect weft absence at a blank pick or may fail to detect such weft absence, but this does not affect the action of the weft supply mechanism, which performs its offices without reference to what the second fork may do. Likewise, after one fork has effectively detected weft absence and set the weft supply controlling mechanism into action, it makes no difference whether that fork itself detects or fails to detect weft absence at a blank pick occurring before the fresh weft is supplied. These are important considerations in a pick matching loom, since weft forks occasionally fail to detect weft absence when they should do so, and are caught by the weft hammer when weft is properly presented, and if the automatic supply of weft and the matching of the pick is in any way dependent upon the proper action of both forks, or repeated successive actions of the same fork, the first strand of fresh weft may get into the wrong shed, thus involving the imperfect weaving which a pick matching mechanism is intended to avoid. In accordance with the present invention, each fork controls the shedding and the weft supply wholly independently of the other, and also independently of its own action following an effective detection by itself which starts the weft supply mechanism into action.

I claim—

1. An automatic weft-replenishing loom having, in combination, a weft-supplying mechanism at one side only of the loom; two weft-absence detectors, one at each side of the loom; a multiplicity of harnesses; an actuator for said harnesses; selector-cams coöperating with said harnesses and determining which shall coöperate with said actuator; driving mechanism for rotating said selector cams; a clutch controlling said selector driving mechanism; a rotating differential shed-governor having a plurality of differing cam paths and two entrances thereto and exits therefrom; connected mechanism between said governor and said harnesses whereby said selector cams may be clutched and unclutched from their driving mechanism, and the harnesses may be uncoupled from their actuator independently of said selector cams, said mechanism comprising a runner adapted to enter said cam-paths through one or the other of their entrances, the passage of said runner into either entrance being followed by the unclutching of the selector cams, but the uncoupling of a harness from the actuator resulting from the passage of the runner into one only of said entrances; connections between said governor and the weft-supply whereby fresh weft is supplied to the loom; a latch for said runner which normally holds said runner idle; connections between said latch and both of said weft-absence detectors whereby when either detector first detects weft-absence the runner is released, and enters the corresponding cam-path entrance of the governor; and means for preventing the action of the weft-supply mechanism when the spent shuttle is at the other side of the loom.

2. An automatic weft-replenishing loom having, in combination, a weft-supply mechanism at one side only of the loom; two weft-absence detectors, one at each side of the loom; a multiplicity of harnesses; an actuator for said harnesses; selector-cams coöperating with said harnesses and determining which shall coöperate with said actuator; driving mechanism for rotating said selector cams; a clutch controlling said selector driving mechanism; a rotating differential shed-governor having a plurality of differing cam paths and two entrances thereto and exits therefrom; connected mechanism between said governor and said harnesses whereby said selector cams may be clutched and unclutched from their driving mechanism, and the harnesses may be uncoupled from their actuator independently of said selector cams, said mechanism comprising a runner adapted to enter said cam-paths through one or the other of their entrances, the passage of said runner into either entrance being followed by the unclutching of the selector cams, but the uncoupling of a harness from the actuator following the passage of the runner into one only of said entrances; connections between said governor and the weft-supply whereby fresh weft is supplied to the loom; a latch for said runner which normally holds said runner idle; and connections between said latch and both of said weft-absence detectors whereby when either detector first detects weft-absence the runner is released, and enters the corresponding cam-path entrance of the governor.

3. An automatic weft-replenishing loom having, in combination, a weft-supply mechanism at one side only of the loom; two weft-absence detectors, one at each side of the loom; a multiplicity of harnesses; an actuator for said harnesses; selecting mechanism coöperating with said harnesses and determining which shall coöperate with said actuator; driving mechanism for said selecting mechanism; a clutch controlling said driving mechanism; a differential shed-governor having a plurality of differing cam paths and two entrances thereto and exits therefrom; instrumentalities between said governor and said harnesses whereby said selecting mechanism may be clutched and unclutched, and the harnesses may be uncoupled from their actuator independently of said selecting mechanism, said instrumentalities comprising a runner adapted to enter said cam-paths through one or the other of their entrances, the passage of said runner into either entrance being followed by the unclutching of the selecting mechanism, but the uncoupling of a harness from the actuator following the passage of the runner into one only of said entrances; and connections between said runner and both of said weft-absence detectors whereby when either detector first detects weft-absence the runner is released, and enters the corresponding cam-path entrance of the governor.

4. An automatic weft-replenishing loom having, in combination, a weft-supplying mechanism; a harness-controlling shaft from which the harnesses are driven, a governor having cam-paths on said shaft, a runner adapted to engage said governor at different points in its revolution, mechanism between said runner and the weft-supply to govern the action of said weft-supplying mechanism, and two weft-absence detectors at opposite sides of the loom respectively controlling said runner, the runner being engaged with said governor at different points depending on which detector first detects weft-absence.

5. An automatic weft-replenishing loom having, in combination, a weft-supplying mechanism; shedding mechanism; two weft-absence-detectors; a differential shed-governor having differing cam-paths with two entrances; a runner which may enter either entrance; connections between said runner and the detector whereby the runner passes into an entrance corresponding to the detector which first detects weft-absence; differentially acting connections between said runner and the shedding mechanism; and connections between said runner and the weft-supplying mechanism.

6. An automatic weft-replenishing loom having, in combination, a weft-supplying mechanism; shedding mechanism; two weft-absence-detectors; a differential shed-governor having differing cam-paths with two entrances; a runner which may enter either entrance; connections between said runner and the detectors whereby the runner passes into an entrance corresponding to the detector which first detects weft-absence; and differentially acting connections between said runner and the shedding mechanism.

7. An automatic weft-replenishing loom having, in combination, a weft-supplying mechanism; shedding mechanism; two weft-absence-detectors; a differential shed-governor having differing cam-paths with two entrances; a runner which may enter either entrance; connections between said runner and the detector whereby the runner passes into an entrance corresponding to the detector which first detects weft-absence; and connections between said runner and the weft-supplying mechanism.

8. An automatic weft-replenishing loom having, in combination, a weft-supplying mechanism; shedding mechanism; two weft-absence detectors, one at each side of the loom; a differential weft-supplying mechanism and shed-governor; mechanism between each detector and said governor; mechanism between said governor and the weft-supplying mechanism determining the action of said weft-supplying mechanism; and means between said governor and the shedding-mechanism to control the same, said means acting differently upon the shedding-mechanism depending upon which detector first detects weft-absence.

9. An automatic weft-replenishing loom having, in combination, weft-supplying mechanism; shedding mechanism; two weft-absence detectors one at each side of the loom; a differential shed-governor controlled by each of said detectors and varying its control of the shedding mechanism depending upon which detector first detects weft absence, said governor acting to arrest the normal sequence of shed formation when either detector acts, and to arrest shed formation when one only of the two detectors acts.

10. An automatic weft-replenishing loom having, in combination, a weft-supplying mechanism; shedding mechanism; two weft-absence detectors at opposite sides of the loom; and means under the control of each detector for stopping the normal sequence of shed-formation, and means under the control of one detector only for arresting shed formation.

11. An automatic weft-replenishing loom having, in combination, shedding mechanism; a weft-supplying mechanism; and two weft-absence detectors each of which controls both the weft-supplying mechanism and the shedding mechanism.

12. An automatic weft-replenishing loom having, in combination, a weft-supplying mechanism at one side; two weft-absence detectors at opposite sides; and means to prevent action of the weft-supply mechanism when the shuttle is boxed at the side of the loom opposite to where the weft-supply mechanism is located, the shuttle continuing its traverses during the period between detection of weft-absence and the replenishment of weft.

13. An automatic weft-replenishing loom having, in combination, a weft-supplying mechanism; a lay; a weft-fork; a weft-fork slide which moves away from the lay when the weft-absence is detected; a cam-actuated weft-hammer to move said slide; a movable cutting blade; a coöperating cutting-blade; a spring connecting said slide and movable blade which is put under tension and opens said blade when said slide is moved by said weft-hammer away from the lay; and a tail on said movable blade which is encountered by the lay to close said blade while the spring is still under tension.

14. An automatic weft-replenishing loom having, in combination, a lay; a weft-supplying mechanism; a weft-fork; a weft-fork slide which moves away from the lay when weft-absence is detected; a cam-actuated weft-hammer to move said slide; a stationary cutting-blade; a movable cutting blade; a spring connecting said slide and movable blade which is put under tension and opens said blade when said slide is moved by said weft-hammer away from the lay; and means for closing said movable blade while the spring is still under tension.

15. An automatic weft-replenishing loom having, in combination, a weft-supplying mechanism; a movable cutting blade; a coöperating cutting-blade; a spring connected with said movable blade; means operative when fresh weft is to be supplied which acts on said spring to put it under tension and open said movable blade; and means for closing said movable blade while the spring is still under tension.

16. An automatic weft-replenishing loom having, in combination, shedding mechanism; a weft-supplying mechanism; and two weft-absence detectors each of which controls the weft-supplying mechanism independently of the other.

17. An automatic weft-replenishing loom having, in combination, shedding mechanism; a weft-supplying mechanism; and two weft-absence detectors each of which controls the weft-supplying mechanism independently of the action or inaction of the other, and independent of its own action or inaction during the period following an effective detection.

In witness whereof, I have hereunto signed my name in the presence of two subscribing witnesses.

CHARLES F. ROPER.

Witnesses:
FRANK S. DUTCHER,
E. A. DARLING.